(12) United States Patent
Jungwirth

(10) Patent No.: US 7,420,688 B2
(45) Date of Patent: Sep. 2, 2008

(54) SCANNING, SELF-REFERENCING INTERFEROMETER

(75) Inventor: Douglas R. Jungwirth, Reseda, CA (US)

(73) Assignee: The Boeing Company, Chicago, IL (US)

(*) Notice: Subject to any disclaimer, the term of this patent is extended or adjusted under 35 U.S.C. 154(b) by 304 days.

(21) Appl. No.: 11/164,228

(22) Filed: Nov. 15, 2005

(65) Prior Publication Data

US 2007/0109547 A1 May 17, 2007

(51) Int. Cl.
*G01B 11/02* (2006.01)
(52) U.S. Cl. .................................................... 356/496
(58) Field of Classification Search ................ 356/508, 356/510
See application file for complete search history.

(56) References Cited

U.S. PATENT DOCUMENTS

| 4,682,025 | A | * | 7/1987 | Livingston et al. ....... 250/201.9 |
| 5,585,921 | A | * | 12/1996 | Pepper et al. ............... 356/487 |
| 5,841,125 | A | * | 11/1998 | Livingston ............... 250/201.9 |

* cited by examiner

*Primary Examiner*—Tarifur R Chowdhury
*Assistant Examiner*—Jonathon D Cook
(74) *Attorney, Agent, or Firm*—Charles L. Moore; Moore & Van Allen, PLLC

(57) ABSTRACT

A scanning, self-referencing interferometer may include a scanning mechanism to scan a path length of a test beam portion of a laser beam. The scanning, self-referencing interferometer may also include a beam adjustment mechanism to control positioning of a centroid of a reference beam portion of the laser beam in the interferometer.

33 Claims, 3 Drawing Sheets

SCANNING, SELF-REFERENCING INTERFEROMETER

BACKGROUND OF THE INVENTION

The present invention relates to lasers beams, laser systems and the like, and more particularly to a scanning, self-referencing interferometer for use with a laser system.

In some applications, generating or providing a laser beam that is substantially free of distortions, fringes and other anomalies or defects may be highly desirable. Phase shifts associated with the fringes of a laser beam can result in such distortions, loss of power and laser efficiency. The phase shifts may be caused by the environment through which the laser beam may need to pass or by other factors. By determining the phase shifts that may be associated with a reference laser beam, a main beam may be corrected for such phase shifts to provide a higher quality beam. Current methods and systems for determining phase associated with a laser beam require extensive calculations over a set of stationary fringes associated with a laser beam. During the time period for determining the phase and what correction may be needed to provide a high-quality beam, the environment may change and an entirely different phase and correction may be needed.

BRIEF SUMMARY OF THE INVENTION

In accordance with an embodiment of the present invention, a scanning, self-referencing interferometer may include a scanning mechanism to scan a path length of a test beam portion of a laser beam. The scanning, self-referencing interferometer may also include a beam adjustment mechanism to control positioning of a centroid of a reference beam portion of the laser beam in the interferometer.

In accordance with another embodiment of the present invention, a system for generating a laser beam substantially corrected for any distortions may include a source to generate a laser beam and a scanning, self-referencing interferometer to facilitate determining any optical phase errors of the laser beam. The interferometer may include a scanning mechanism to scan a path length of a test beam portion of the laser beam.

In accordance with another embodiment of the present invention, a system for generating a laser beam substantially corrected for any distortions may include a source to generate a laser beam and a scanning, self-referencing interferometer to facilitate determining any optical phase errors of the laser beam. The scanning, self-referencing interferometer may include a scanning mechanism to scan a path length of the test beam portion. The scanning, self-referencing interferometer may also include an aperture and a beam adjustment mechanism to direct a centroid of the reference beam portion through the aperture.

In accordance with another embodiment of the present invention, a method for generating a laser beam substantially corrected for any distortions may include splitting the laser beam into a test beam portion and a reference beam portion. The method may also include scanning a path length of the test beam portion of a laser beam. The method may further include detecting a fringe pattern of a combined reference beam portion and test beam portion and determining a magnitude and position of any optical errors of the laser beam.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

The following detailed description of embodiments refers to the accompanying drawings, which illustrate specific embodiments of the invention. Other embodiments having different structures and operations do not depart from the scope of the present invention.

Figure 1:
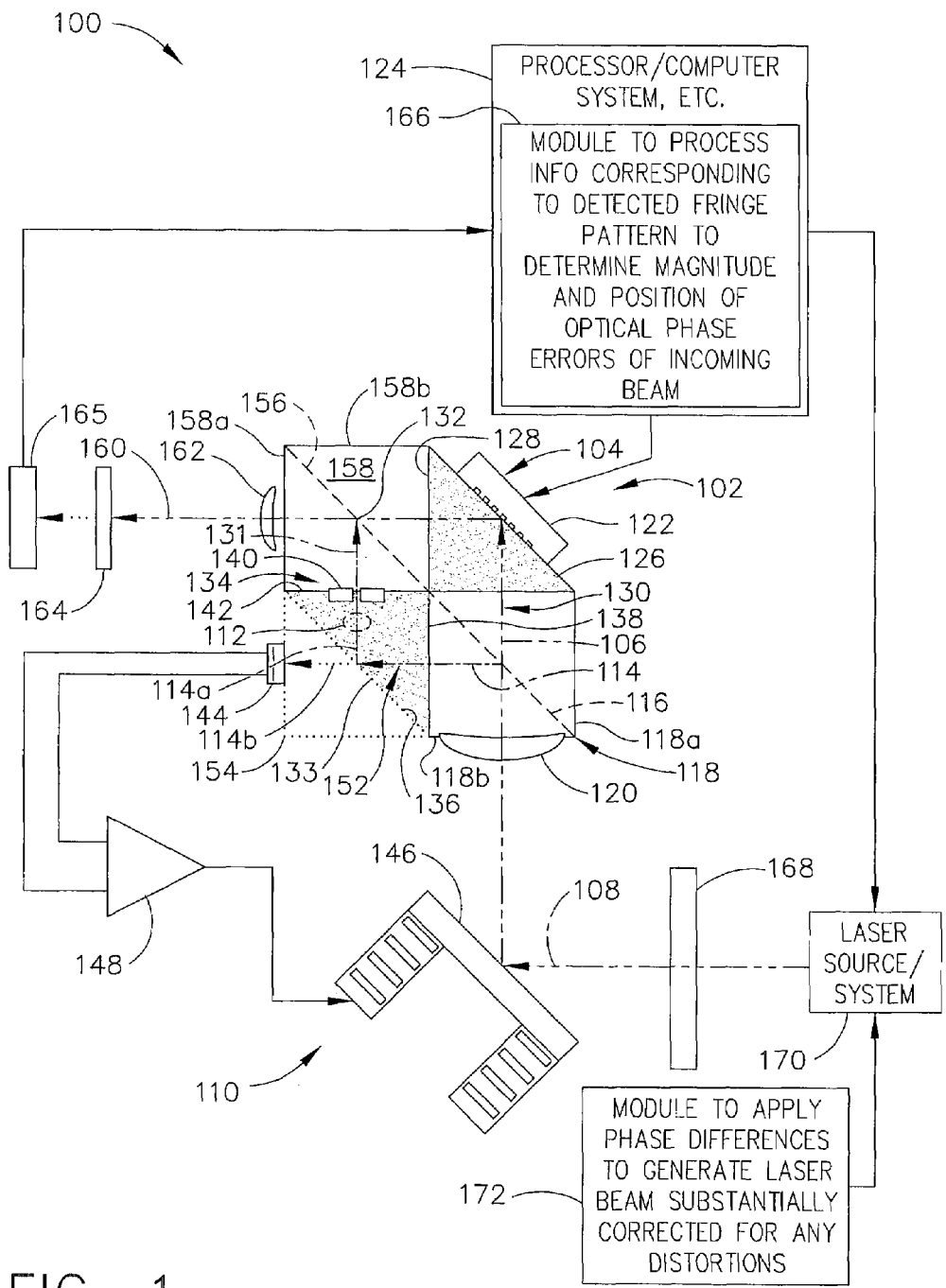
FIG. 1 is a block diagram of a laser system including a scanning, self-referencing interferometer in accordance with an embodiment of the present invention.

FIG. 1 is a block diagram of a laser system 100 including a scanning, self-referencing interferometer 102 in accordance with an embodiment of the present invention. The scanning, self-referencing interferometer 102 may include a scanning mechanism 104 to scan a path length of a test beam portion 106 of a laser beam 108. The path length may be defined as the distance individual photons travel including physical separation and the effects of the index of refraction. The scanning, self-referencing interferometer 102 may also include a beam adjustment mechanism 110 to control positioning of a centroid 112 or "hot spot" of a reference beam portion 114 of the laser beam 108 in the interferometer 102 as described in more detail below.

The scanning, self-referencing interferometer 102 may also include a polarization beam splitter 116 to split the laser beam 108 entering the interferometer 102 into the test beam portion 106 and the reference beam portion 114. The polarization beam splitter 116 may be a polarization beam splitter cube 118 or the beam splitter 116 may be formed or disposed between first and second right angle prisms 118a and 118b that form the cube 118. The optical prisms 118a and 118b may be joined or bonded by an optical cement or by similar means. An input lens 120 may be provided to focus the laser beam 108 through the polarization beam splitter 116. The input lens 120 may be a custom lens and may be designed to match input parameters to output parameters, such as beam diameters, pupil planes or other optical parameters.

The scanning mechanism 104 may include a moveable high reflectivity mirror, piezo mirror 122 or the like. The piezo mirror 122 may be controlled by software or a computer program product operable on a processor, computer system 124 or similar control device. The piezo mirror 122 may be disposed on a surface of a hypotenuse side 126 of a third right prism 128. The third right prism 128 may be optically and structurally aligned with the beam splitter cube 118. The third right prism 128 may be joined or bonded to the beam splitter cube 118 by an optical cement or the like.

The piston motion of the piezo mirror 122 causes optical path length variation in the test beam arm or path 130 of the interferometer 102. When the test arm or path 130 is combined with a reference arm beam 131 at a location 132, optical fringes are formed by the interference of the two beams. The scanning piezo mirror 122 causes those fringes to scan as a direct result of the optical path length changes. If the tilt of the piezo mirror 122 is aligned into the fringes originally, the fringes may be scanned laterally. If aligned to null the fringes, the fringes will appear to blink on and off. As described below, beam position feedback via the beam adjustment mechanism 110 may maintain very accurate positioning of the fringes of the test beam portion 106 and in the reference beam path 114.

With triangle wave scanning on the piezo mirror 122, linear (in time) fringe motion can be achieved for a duty cycle of about 90% or more. This may permit parallel processing of the output fringe pattern by the processor 124. This may also allow for high frequency fringe detection.

The scanning, self-referencing interferometer 102 may further include a partial reflector 133 to reflect a substantial segment 114a of the reference beam portion 114 of the laser beam 108 to a spatial filter 134. A smaller segment 114b of the reference beam portion 114 may be passed by the partial reflector 133 for use by the beam adjustment mechanism 110. The partial reflector 133 may be a mirror with a reflectivity of between about 85% to about 95%. The partial reflector 133 may be disposed or formed on a surface of a hypotenuse side 136 of a fourth right angle prism 138.

The spatial filter 134 may include an aperture 140 to pass substantially only the "zeroth order" (or Gaussian beam) portion of the segment 114a of the reference beam portion 114. The beam adjustment mechanism 110 may direct or focus the centroid 112 of the reference beam portion 114 through or on the aperture 140. The aperture 140 may be a pinhole aperture and may be a discrete component or may be coated on an optical surface 142 of the prism 138.

The beam adjustment mechanism 110 may include a position detector or sensor 144 to monitor the location of the centroid 112 of the reference beam portion 114. An example of the position detector 144 may be a SPOT 4D from United Detector Technology or a similar detector. Signals or information related to the location of the centroid 112 of the reference beam portion 114 may be fed back to a second moveable, high reflectivity mirror or piezo mirror 146 or the like. An amplifier or integrator 148 may be provided to condition the signals from the position detector 144 for use in adjusting the positioning or tilt of the piezo mirror 146 to reflect the incoming laser beam 108 to cause the centroid 112 of the reference beam portion 114 to be directed or focused on the aperture 140. In other words, the moveable mirror or piezo mirror 146 may be controlled by the position detector 144 to focus the centroid 112 of reference beam portion 114 on the aperture 140 to pass substantially only the zeroth order (or Gaussian) portion of the reference beam 114 through the aperture 140 thereby filtering any distortions or other anomalies from the periphery of the reference beam portion 114 and to provide a substantially undistorted beam or filtered reference beam 131. The path of the reference beam portion 114 through the interferometer 102 may define a reference beam arm or path 152 through the scanning, self-referencing interferometer 102.

The position detector 144 may be disposed on a fifth right angle prism 154. A hypotenuse side of the fifth right prism 154 may be joined or bonded to the surface of the hypotenuse side 136 of the fourth right prism 138 and aligned therewith with the partial reflector 133 disposed therebetween. The position detector 144 may also be used for feedback on input beam jitter, initial alignment of the laser beam entering the interferometer 102, beam diagnostics and similar uses. The beam diagnostics may include detecting a magnitude and frequency of beam jitter, beam asymmetry or other beam anomalies.

The scanning, self-referencing interferometer 102 may include another polarization beam splitter 156. The polarization splitter 156 may be disposed between a sixth and a seventh right angle prism 158a and 158b which may form a polarization beam splitter cube 158. The polarization beam splitter cube 158 may be disposed with one side abutting and aligned with a side of the third right angle prism 128 and an adjacent side abutting and aligned with a side of the fourth right angle prism 138. The mutual abutting sides may be joined or bonded by an optical cement or the like that minimizes any reflection or refraction at an interface between the mutual sides.

The filtered reference beam portion 131 may be reflected by the beam polarization splitter 156 and may be combined with the test beam 106 to form a combined laser beam 160. An output lens 162 may collimate the combined beam 160. The output lens 162 may be a custom lens similar to the input lens 120 to match the output parameters with the input parameters, such as beam diameter, pupil planes or similar optical parameters.

The combined beam 160 may be sent through a polarizer 164. The combined beam 160 may be analyzed by a detector array 165 to determine the electrical phase of the signal incident upon it. An example of the detector array 165 may be a Sensors Unlimited SU320mSVis—1.7RT camera or the like. Any differences in the electrical phase of the signals generated by the detector array 165 is an indication of a localized distortion in the optical phase of the input laser beam 108. A module 166 may be provided to determine any differences in the electrical phase of the signals derived from the detector array 165. The module 166 may process information corresponding to a detected fringe pattern to determine a magnitude and position of any optical phase errors of the incoming beam 108. The module 166 may be operable on the processor 124.

The system 100 may further include an adjustable polarization plate 168. The adjustable polarization plate 168 may control an amount of light split between the test beam portion 106 and the reference beam portion 114 of the laser beam 108 entering the self-referencing interferometer 102.

Any optical phase differences, phase errors or phase measurements may be provided to a laser source or system 170. The laser source or system 170 may include or may be associated with a module 172 to apply any phase differences to generate a laser beam substantially corrected for any distortions. The module 172 may be or may include a phase correction device, such as a deformable mirror, spatial light modulator or other device capable of applying phase corrects to a laser beam.

The scanning, self-referencing interferometer 102 may be a monolithic structure or formed by discrete components. The different optical elements, such as the different right angle prisms or cubes may be joined or bonded by an optical cement or other means, similar to that previously described, to minimize reflections or refractions at interfaces between elements except were reflective elements or partially reflective may be disposed between other elements.

Figure 2A:
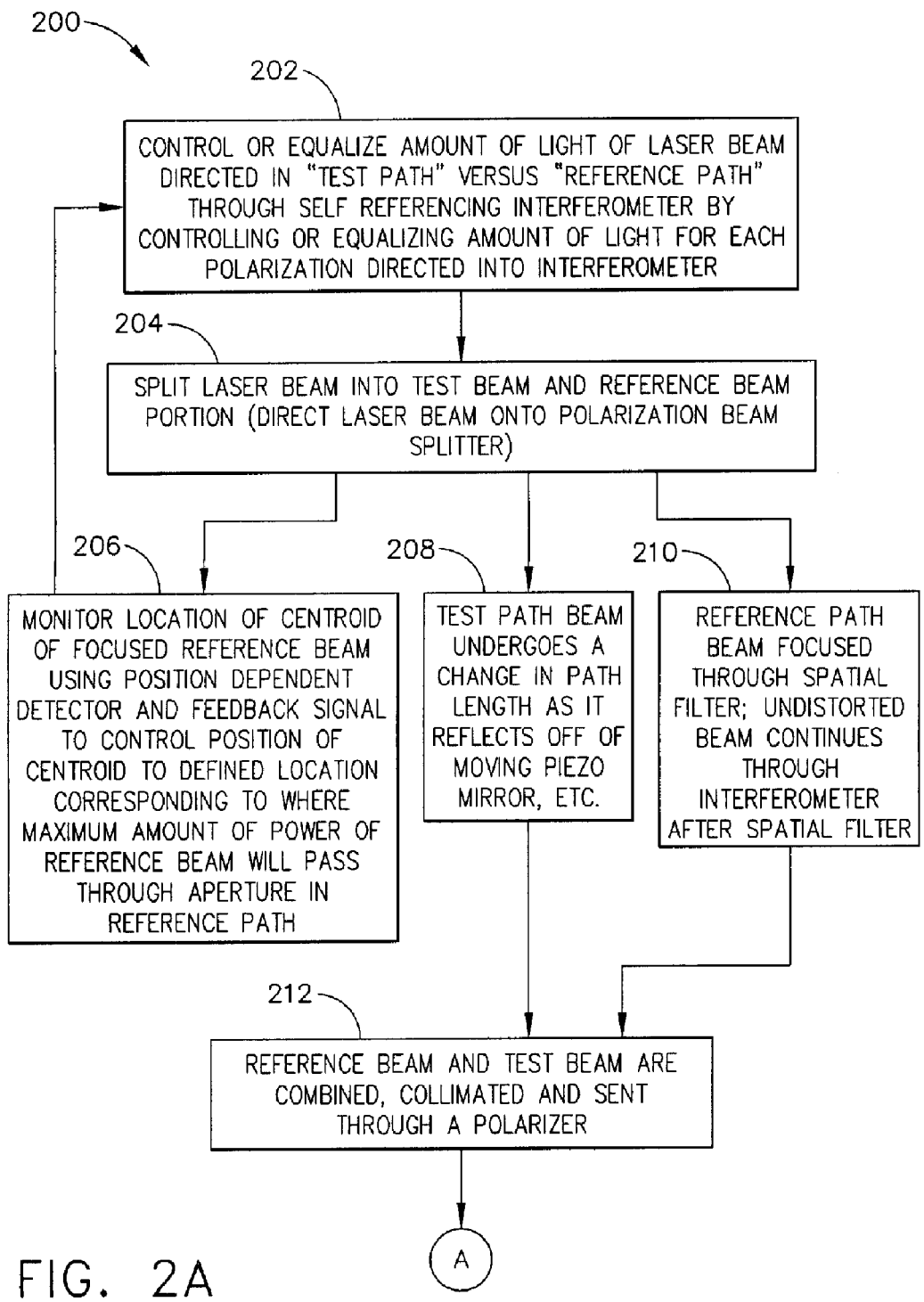
FIGS. 2A and 2B (collectively FIG. 2) are a flow chart of an example of a method for generating a laser beam substantially corrected for any distortions in accordance with an embodiment of the present invention.
Figure 2B:
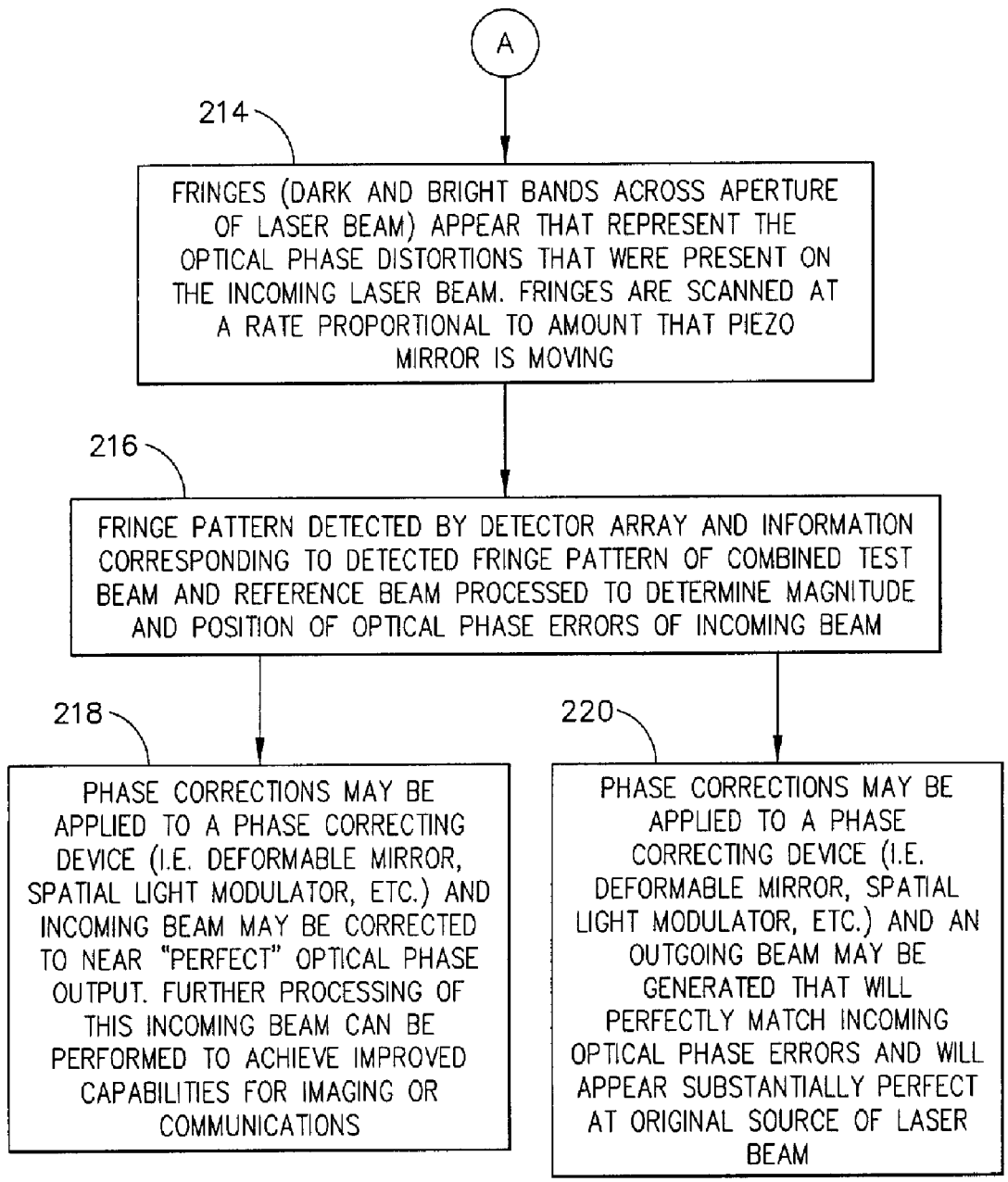

FIG. 2 is a flow chart of an example of a method 200 for generating a laser beam substantially corrected for any distortions in accordance with an embodiment of the present invention. The method 200 may be embodied in the system 100 of FIG. 1. In block 202, an amount of light of a laser beam directed in a "Test Path" versus a "Reference Path" through a scanning, self-referencing interferometer may be controlled or equalized by controlling or equalizing an amount of light for each polarization directed into the interferometer. The scanning, self-referencing interferometer may be similar to the interferometer 102 of FIG. 1. The "Test Path" may be similar to the test beam arm or path 130 in the interferometer 102 and the "Reference Path" may be similar to the reference beam arm or path 152.

In block 204, the laser beam may be split into a test beam portion or test path beam and reference beam portion or reference path beam. The laser beam may be split by directing the laser beam on a beam splitter similar to the beam splitter 116 described with respect to FIG. 1. The test beam portion may follow the "Test Path" through the interferometer and the reference beam portion may follow the "Reference Path" through the interferometer.

In block 206, the location of the centroid of the focused reference beam portion may be monitored using a position dependent detector, such as position detector 144 in FIG. 1 or the like. A signal may be feedback from the position dependent detector to control positioning of the centroid to a defined location corresponding to where substantially a maximum amount of power of the reference beam portion will pass through an aperture, such as aperture 140 in FIG. 1, in the reference path. The signal may be feedback to a piezo mirror, such as mirror 146 in FIG. 1 or the like, to control the location of the centroid.

In block 208, a the test path beam may undergo a change in path length as the test beam reflects off of a moving piezo mirror or the like, similar to that described with respect to mirror 122 in FIG. 1.

In block 210, a reference path beam may be focused through a spatial filter, for example filter 134 in FIG. 1, to provide an undistorted beam through the interferometer after the filter. In block 212, the reference path beam and test path beam may be combined, collimated and sent through a polaizer.

In block 214, fringes or dark and bright bands across the aperture or footprint of the laser beam appear that represent the optical phase distortions that were present on the incoming laser beam entering the interferometer. The fringes may be scanned at a rate proportional to an amount or frequency that the piezo mirror (for example mirror 122 in FIG. 1) is moving.

In block 216, the fringes or fringe pattern may be detected by a detector array, such as detector array 165 in FIG. 1 or the like. The information from the detector array may be processed to determine the magnitude and position of the optical phase errors of the incoming beam similar to that done with current standard interferometer systems.

In block 218, phase corrections can be applied to a phase correcting device, such as a deformable mirror, spatial light modulator or the similar devices. The incoming beam may be corrected to near perfect optical phase output. Further processing of the incoming beam can be performed to achieve beam quality or improved capabilities for imaging, communications or other applications that may require a high-quality beam.

In block 220, phase corrections can be applied similar to block 218 and an outgoing beam can be generated that may substantially match the incoming optical phase errors and may appear substantially perfect at the original source of the laser beam.

While some blocks in FIG. 2 are illustrated as being parallel to other blocks, these blocks illustrate functions or operations that may occur simultaneously but are not necessarily performed simultaneously. Accordingly, illustrating these blocks in this manner is not intended to limit the present invention in any way.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A scanning, self-referencing interferometer, comprising:
   a beam splitter cube to split a laser beam into a test beam portion and a reference beam portion;
   a right angle prism disposed on the beam splitter cube, wherein the right angle prism is structurally and optically aligned with the beam splitter cube; and
   a scanning mechanism to scan a path length of the test beam portion of the laser beam, wherein the scanning mechanism is disposed on a hypotenuse of the right angle prism to receive the test beam portion of the laser beam from the beam splitter cube.

2. The scanning, self-referencing interferometer of claim 1, wherein the scanning mechanism comprises a moveable high reflectivity mirror.

3. The scanning, self-referencing interferometer of claim 1, wherein the scanning mechanism comprises a piezo mirror.

4. The scanning, self-referencing interferometer of claim 1, further comprising a spatial filter to pass substantially only a zeroth order portion of the reference beam portion.

5. The scanning, self-referencing interferometer of claim 1, further comprising an aperture to pass substantially only a centroid of the reference beam portion.

6. The scanning, self-referencing interferometer of claim 5, wherein the beam adjustment mechanism comprises:
   a position detector; and
   a moveable mirror controllable by the position detector, wherein the moveable mirror is adjusted in response to a signal from the position detector to reflect the laser beam to control a position of the centroid of the reference beam portion to define a location corresponding to where substantially a maximum amount of power of the reference beam portion will pass through the aperture.

7. The scanning, self-referencing interferometer of claim 1, further comprising a module to process information corresponding to a detected fringe pattern of a combined test beam portion and reference beam portion to determine a magnitude and position of any optical phase errors associated with the laser beam.

8. The scanning, self-referencing interferometer of claim 1, further comprising an adjustable polarization plate to control an amount of light split between the test beam portion and the reference beam portion of the laser beam.

9. A system for generating a laser beam substantially corrected for any distortions, comprising:
a source to generate a laser beam; and
a scanning, self-referencing interferometer to facilitate determining any optical phase errors of the laser beam, wherein the interferometer comprises:
a beam splitter cube to split the laser beam into a test beam portion and a reference beam portion;
a right angle prism disposed on the beam splitter cube, wherein the right angle prism is structurally and optically aligned with the beam splitter cube; and
a scanning mechanism to scan a path length of the test beam portion of the laser beam, wherein the scanning mechanism is disposed on a hypotenuse of the right angle prism to receive the test beam portion of the laser beam from the beam splitter cube.

10. The system of claim 9, wherein the scanning mechanism comprises a moveable mirror.

11. The system of claim 9, wherein the interferometer further comprises:
a filter; and
a beam adjustment mechanism to cause substantially only a centroid of a reference beam portion of the laser beam to pass through the filter.

12. The system of claim 11, wherein the filter comprises an aperture to pass substantially only a zeroth order of the reference beam portion through the aperture.

13. The system of claim 12, wherein the beam adjustment mechanism comprises:
a position detector; and
a moveable mirror controllable by the position detector to control a position of the centroid of the reference beam portion to define a location corresponding to where substantially a maximum amount of power of the reference beam portion will pass through the aperture.

14. The system of claim 13, wherein the moveable mirror comprises a piezo mirror.

15. The system of claim 9, wherein the beam splitter cube comprises:
a first right angle prism;
a second right angel prism; and
a polarization beam splitter formed between hypotenuses of the first and second right angle prisms to split the laser beam into the test beam portion and the reference beam portion.

16. The system of claim 9, further comprising:
a computer system; and
a module operable on the computer system to process information corresponding to a detected fringe pattern of a combined reference beam and test beam to determine a magnitude and position of any optical phase errors of the laser beam.

17. The system of claim 9, further comprising a module to apply any phase differences to generate the laser beam substantially corrected for any distortions.

18. The system of claim 9, further comprising a detector array to detect a fringe pattern of a combined reference beam and test beam.

19. A system for generating a laser beam substantially corrected for any distortions, comprising:
a source to generate a laser beam;
a scanning, self-referencing interferometer to facilitate determining any optical phase errors of the laser beam, the self-referencing interferometer comprising:
a polarization beam splitter cube to split the laser beam into a test beam portion and a reference beam portion;
a first right angle prism disposed on a side of the polarization beam splitter cube, wherein the first right angle prism is structurally and optically aligned with the beam splitter cube;
a scanning mechanism to scan a path length of the test beam portion, wherein the scanning mechanism is disposed on a hypotenuse of the first right angle prism to receive the test beam portion of the laser beam from the beam splitter cube;
a second right angle prism disposed on another side of the beam splitter cube;
a partial reflector formed on a hypotenuse of the second right angle prism;
a third right angle prism disposed on a side of the second right angle prism;
an aperture formed between the second right angle prism and the third right angle prism; and
a beam adjustment mechanism to direct a centroid of a reference beam portion through the aperture.

20. The system of claim 19, wherein the scanning mechanism comprises a moveable high reflectivity mirror.

21. The system of claim 20, wherein the beam adjustment mechanism comprises:
a position detector, wherein the position detector is disposed on a side of a fourth right angle prism to receive a segment of the reference beam portion passed by the partial reflector, the partial reflector being disposed between a hypotenuse of the fourth right angle prism and the hypotenuse of the second right angle prism; and
a moveable mirror controllable by the position detector to control a position of the centroid of the reference beam portion to define a location corresponding to where substantially a maximum amount of power of the reference beam portion will pass though the aperture.

22. The system of claim 20, wherein the beam splitter cube comprises:
a fourth right angle prism;
a fifth right angel prism; and
a beam splitter formed between the fourth right angle prism and the fifth right angle prism to split the laser beam into the test beam portion and the reference beam portion.

23. The system of claim 20, further comprising a module to process information corresponding to a detected fringe pattern of a combined reference beam and test beam to determine a magnitude and position of any optical phase errors of the laser beam.

24. The system of claim 20, further comprising an adjustable polarization plate to control an amount of light split between the test beam portion and the reference beam portion of the laser beam.

25. A method for generating a laser beam substantially corrected for any distortions, comprising:
splitting a laser beam into a test beam portion and a reference beam portion using a beam splitter cube;
scanning a path length of the test beam portion of the laser beam with a scanning mechanism positioned on a hypotenuse of a right angle prism, the right angle prism being structurally and optically aligned with the beam splitter cube;

detecting a fringe pattern of a combined reference beam portion and test beam portion of the laser beam; and determining a magnitude and position of any optical errors of the laser beam.

26. The method of claim 25, further comprising determining a phase of all points of the scanned path length of the test beam portion.

27. The method of claim 25, further comprising:
detecting a centroid of the reference beam portion; and
filtering the reference beam portion to remove any distortion surrounding the centroid.

28. The method of claim 25, further comprising:
detecting a centroid of the reference beam portion; and
controlling movement of a mirror in response to detecting the centroid to cause substantially a maximum amount of power of the reference beam portion to pass through an aperture.

29. The method of claim 25, further comprising equalizing an amount of light directed in a test path versus a reference path through a scanning, self-referencing interferometer.

30. The method of claim 29, further comprising equalizing an amount of light for each polarization of the laser beam directed into the interferometer.

31. The method of claim 25, further comprising splitting the laser beam into the test beam portion and the reference beam portion by directing the laser beam on a beam splitter.

32. The method of claim 25, further comprising detecting any differences in electrical phase of signals corresponding to any parts of the combined reference and test beam portions to provide an indication of any localized distortion in the optical phase of the laser beam.

33. The method of claim 25, further comprising applying any phase corrections to generate the laser beam substantially corrected for any distortions.

* * * * *